H. E. COOK.
HARNESS ATTACHMENT.
APPLICATION FILED SEPT. 6, 1917.
1,274,143.
Patented July 30, 1918.
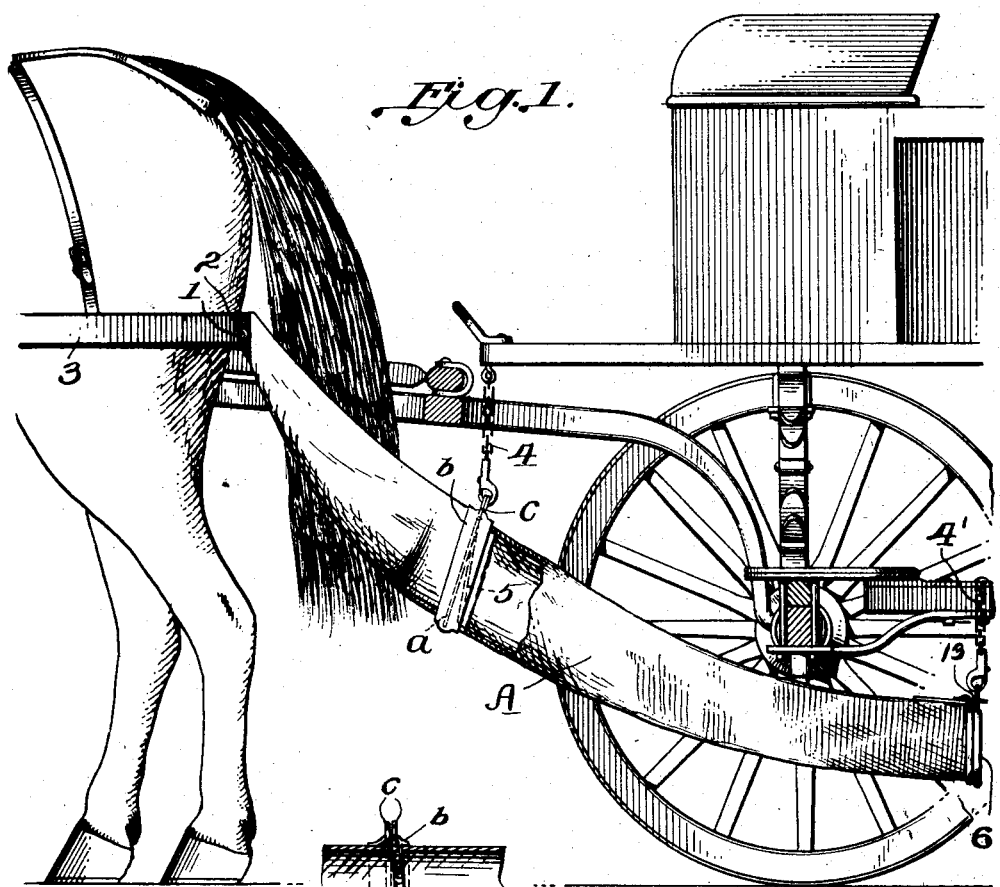
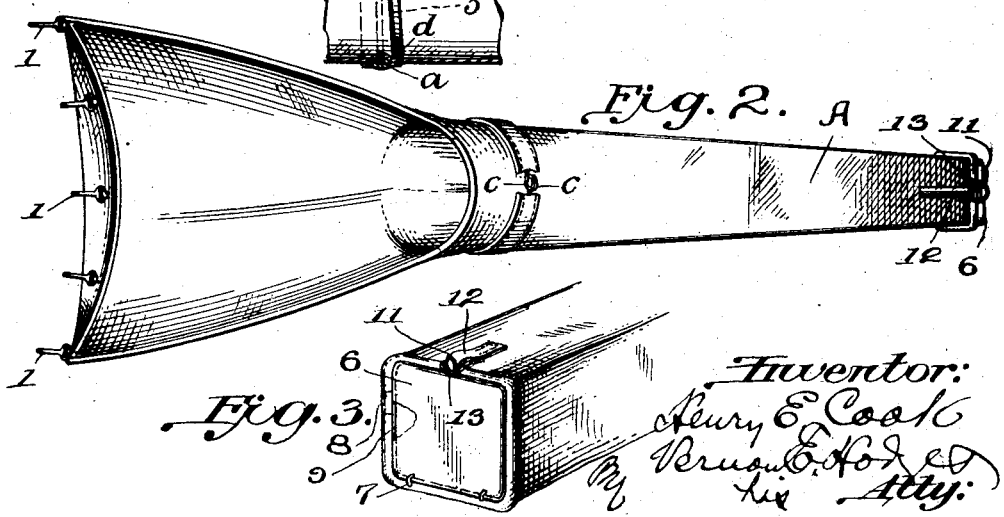

UNITED STATES PATENT OFFICE.

HENRY E. COOK, OF BALTIMORE, MARYLAND, ASSIGNOR TO EMMA M. COOK, OF BALTIMORE, MARYLAND.

HARNESS ATTACHMENT.

1,274,143.  Specification of Letters Patent.  Patented July 30, 1918.

Application filed September 6, 1917. Serial No. 190,007.

*To all whom it may concern:*

Be it known that I, HENRY E. COOK, a citizen of the United States, residing at Baltimore city, in the State of Maryland, have invented certain new and useful Improvements in Harness Attachments, of which the following is a specification.

My invention relates to an improvement in harness attachments, the object being to provide a convenient means for catching the manure and preventing its spread upon the streets, public high-ways, and in the stable. It consists in a tube mainly closed, and having a gravity drop valve therein for automatically closing it and confining odors, and also means at the lower end for emptying the device.

In the accompanying drawings:

Figure 1 is a side elevation with parts broken away;

Fig. 2 is a plan view;

Fig. 3 is a detail perspective of the discharge end; and

Fig. 4 is a detail.

A, is the attachment, preferably made of canvas or similar flexible material, it having snap-hooks or other means 1 for attachment to the rings 2 on the breeching 3 of the harness. Chains 4 and 4' are provided at different points for attachment to different parts of the vehicle.

At or near the center is a valve 5, preferably of canvas or like material, which drops by gravity into the vertical position illustrated in Fig. 1, in order to automatically close the device, and prevent the escape of odor.

While this valve 5 may be variously constructed, as a simple means of construction it is proposed to form a circular support for the tubular portion of the attachment in the way of a wire $a$ which is inserted through a pocket $b$ stitched to the exterior, and this wire terminates in two overlapping loops $c$, to which the snap-hook on the end of the chain 4 may be hooked. The valve may be formed by stitching the edges of a piece of canvas around a circular wire loop $d$ as shown in Fig. 4. This loop is pivotally suspended at its upper edge to one of the loops $c$ by stitching through or in any other approved or convenient manner.

At the lower or discharge end, there is a door 6 hinged at 7 to the discharge end of the device. As a convenient detail construction, the discharge end of the device (which is preferably made of canvas or other similar material) is fastened around a frame 8 of wire or similar material, and the door 6 is similarly fastened around a slightly smaller wire 9, as shown in detail in Fig. 3.

The door 6 has an eyelet 11 at the upper end, and a loop 12 on the tube has a ring 13 which extends over the eyelet 11, and by hooking the snap-hook at the lower end of the chain 4 into this eyelet 11, it holds the door closed, while at the same time supporting the attachment at that end, as shown in Fig. 1.

In the use of this device, the streets are kept clean, and much of the sweeping is rendered unnecessary, and at the same time the manure does not become mixed with the oil from automobiles, which, it has been proven, destroys its efficiency as a fertilizer.

The device is easily attached or detached.

More or less slight changes might be made in the form and arrangement of the device without departure from my invention.

I claim:

1. A harness attachment made of flexible material in tubular form, and having an open surrounding frame secured thereto for holding the tubular portion of the attachment in corresponding shape, the ends of the frame terminating in overlapping loops, and means attached to these loops for suspending the harness attachment.

2. A harness attachment made of flexible material in tubular form and having an open surrounding frame secured thereto for holding the tubular portion of the attachment in corresponding shape, the ends of the frame terminating in overlapping loops, means attached to these loops for suspending the attachment, and a valve hinged to said frame within the tube.

3. A harness attachment comprising a flexible tube, a frame secured around the lower end thereof to which the tube is secured, a door hinged to the frame, the frame of the door being slightly larger than the interior diameter of the frame at the lower end of the tube, means for fastening said door in a closed position, and means extending from the fastening means for the suspension of the lower end of the tube.

In testimony whereof I affix my signature.

HENRY E. COOK.